(No Model.)
R. S. PERRIN.
PROCESS OF AND APPARATUS FOR CLEANSING MEAL FROM WHICH OIL HAS BEEN EXTRACTED.
No. 248,343. Patented Oct. 18, 1881.
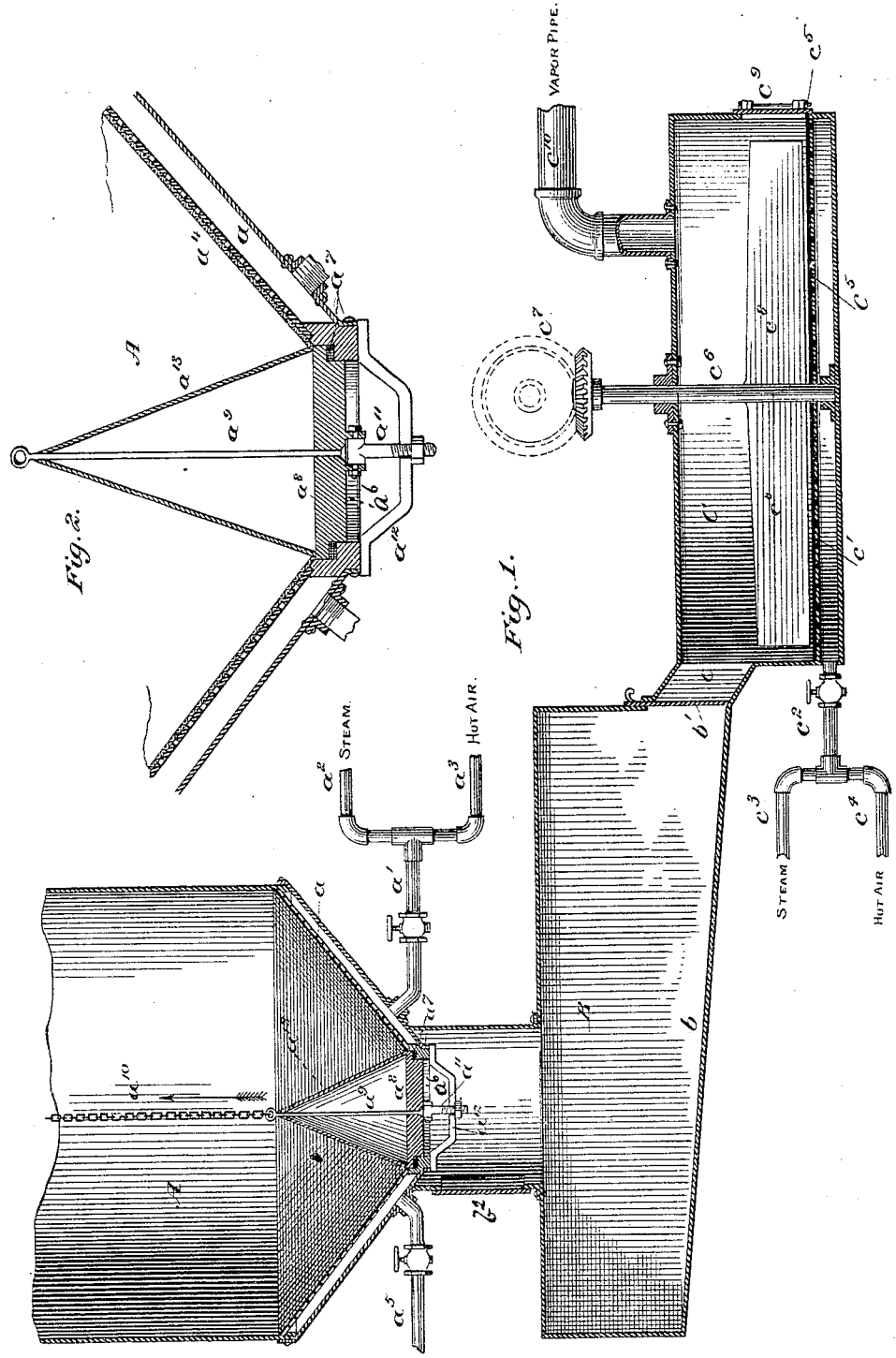
Attest:
R. F. Barnes.
Alex. Scott
Inventor:
Raymond S. Perrin
by F. W. Ritter Jr atty

UNITED STATES PATENT OFFICE.

RAYMOND S. PERRIN, OF NEW YORK, N. Y.

PROCESS OF AND APPARATUS FOR CLEANSING MEAL FROM WHICH OIL HAS BEEN EXTRACTED.

SPECIFICATION forming part of Letters Patent No. 248,343, dated October 18, 1881.

Application filed November 12, 1880. (No model.)

*To all whom it may concern:*

Be it known that I, RAYMOND S. PERRIN, a citizen of the United States, residing at New York, city, in the county of New York and State of New York, have invented certain new and useful Improvements in Processes of and Apparatus for Purging Meal from which Oil has been Extracted and Removing the Residual Hydrocarbons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the drawings, Figure 1 is a sectional view of apparatus embodying my invention, and adapted to the carrying out of my process. Fig. 2 is an enlarged sectional view of the lower end of the percolator.

Like letters refer to like parts wherever they occur.

My invention relates to that class of processes and apparatus employed for purging the meal from residual hydrocarbon, where hydrocarbons are employed in extracting oil from seeds, &c.; and it consists, first, in the treatment of the seed, after percolation is finished, with repeated and alternate blasts of heated air and steam, whereby the residual hydrocarbon is removed and the meal obtained in better and more marketable condition; secondly, in the combination, with a percolator, of a conical discharge valve, or valve having a deflector arranged thereon, said valve opening inward to permit the free discharge of the contents of the percolator, and having a pivoted bolt attached to its under surface, said bolt adapted to engage with a bracket secured to the percolator whereby the valve can be readily and securely fastened upon its seat; thirdly, in the combination, in an apparatus for treating oleaginous seeds, of a jacketed perforated percolator provided with an induction pipe or pipes for air and steam, and an eduction vapor-pipe, a receiver or receptacle for receiving the seed from the percolator, and an agitator having a perforated false bottom, and provided with an air and steam induction pipe or pipes, and an eduction vapor-pipe, whereby the oil may be extracted from the seed, the residual hydrocarbon removed, and the meal dried with rapidity and by a single continuous process.

In the treatment of oleaginous seeds—as, for instance, flaxseed, cotton-seed, &c., for the purpose of extracting the oil, the preferred method, and that now commonly practiced, is to crush the seed or reduce it to a meal, and then to subject it to the action of a hydrocarbon in a suitable percolator.

In order to purge the meal as far as possible from the residual hydrocarbon and render it marketable as food for stock, and for other purposes, the common practice is to subject the meal, after percolation is finished, to the action of steam; but steam alone has heretofore been found ineffectual, unless the same was superheated, and when superheated steam is employed the meal is more or less injured by burning or cooking, and its value is greatly reduced. Moreover, the meal, after being thus treated with superheated steam, has to be removed, to a separate drier, and the whole process is a long and tedious one, occupying an average of twelve (12) hours, and, of course, adding greatly to the cost of the product.

The object of my invention is, therefore, first, to remove the residual hydrocarbon without injury to the meal, so as to obtain a better and more marketable product; and, secondly, to expedite the drying of the meal, and, as a consequence, reduce the cost at which the product is obtained.

I will now proceed to describe my invention more fully, in order that others skilled in the art to which it appertains may apply the same, and, in order to be more clearly understood, will first describe apparatus adapted to the purpose.

A indicates the lower part of percolator for the reception of the crushed seed. The upper part of this percolator (not shown in the drawings) may be provided with a door or man-hole for charging the seed into the percolator, a pipe leading to a suitable reservoir for the admission of the hydrocarbon, and a gas-exit pipe for conducting off the gas, &c., from the percolator, all of which is well known and forms no part of the present invention. The lower end of the percolator A is jacketed or constructed with a double bottom, (the inner being perforated,) thus forming a chamber, $a$, to which blasts of hot air and steam are admitted through a valved pipe, $a'$, from steam-pipe $a^2$ and hot-air pipe $a^3$, and whence the hot air and steam escape into the percolator A through the perforated inner bottom and permeate the mass of seed.

In order to prevent the seed or meal from sifting through the perforated bottom, a covering, $a^4$, of canvas, coarse duck, or other suitable material should be used.

$a^5$ indicates a pipe for drawing off the oil and hydrocarbon from the percolator, and $a^6$ a port or door for discharging the seed. This port or door $a^6$ is formed with a suitable seat on which is a rubber or equivalent gasket, $a^7$, and it is closed by a valve, $a^8$, which opens inward, as indicated by the arrow.

The valve $a^8$ may be a solid plate of cast or other metal, and is provided with a stem, $a^9$, from which extends a chain, $a^{10}$, by which the valve is raised or lowered. The upper end of the chain $a^{10}$ may pass around a suitable windlass.

Pivoted to the under side of valve $a^8$ is a bolt, $a^{11}$, provided with a suitable nut, and to the bottom of the percolator, across the valve-opening, is a bracket, $a^{12}$, having a notch for the reception of the bolt $a^{11}$. When the valve $a^8$ is on its seat it may be secured by swinging the bolt $a^{11}$ into the notch of the bracket and tightening up the nut.

In order that the valve $a^8$ may be readily raised to open the discharge-orifice of the percolator I surmount it with a deflector or cone, $a^{13}$, which may be formed of sheet metal of sufficient thickness to withstand the pressure in the percolator. By this means it will be seen I obtain a light, strong door or valve, which can be easily operated to open or close the bottom of the percolator, and which will require but a single bolt to secure it, as the weight of the contents of the percolator will aid in closing the valve and insuring a tight joint.

Below the percolator A is arranged a receptacle, B, adapted to receive the seed or meal from the percolator, and this receptacle should be provided with an inclined bottom, $b$, or with other suitable means (such as a traveling belt or conveyer) for directing the seed into a third chamber or agitator. It is also provided with a door, $b^2$, by which access may be had to the valve in the bottom of the percolator, and is separated from the agitator by a door or slide, $b'$.

C indicates an agitator connected with receptacle B by a spout, $c$. This agitator is a closed chamber provided with a perforated false bottom, forming a chamber, $c'$, to which alternate blasts of hot air and steam are admitted through valved pipe $c^2$ from steam-pipe $c^3$ and hot-air pipe $c^4$, and whence the hot air and steam escape through the perforated false bottom into agitator C. The perforated false bottom should be covered with canvas or coarse duck $c^5$, to prevent the meal from sifting through the perforated bottom into chamber $c'$. Within the agitator C is a shaft, $c^6$, which may be driven by means of cog or other suitable gearing, $c^7$, and said shaft is provided with wings or blades $c^8$, adapted to turn over and stir up the contents of agitator C.

$c^9$ indicates a door for the discharge of the contents of the agitator, and $c^{10}$ a gas-exit pipe for the escape of hydrocarbon or other gaseous matter, vapors, &c.

In carrying out my process the apparatus herein described, or its equivalent, will be employed, as follows:

The percolator A will be filled with the crushed seed or meal through the charging-door, the door securely closed, the requisite quantity of hydrocarbon admitted to the percolator, and percolation allowed to take place in the usual manner.

When the oil has been extracted and drawn off through pipe $a^5$ alternate blasts of hot air and steam will be repeatedly forced through the chamber $a$ and perforated bottom of the percolator, and will permeate the meal, carrying off the residual hydrocarbon. The process is carried on by continuing the steam-blast for several minutes and then shutting it off and turning on the hot air, which latter, in a few moments is, in turn, shut off and the steam again introduced.

Care should be taken that the temperature of the steam is not sufficiently high to overheat, burn, or cook the meal. As the hot air alternates with the steam it will dissipate any moisture which may be caused by condensation of the steam, and thus preserve the quality of the meal. As soon as the meal has been sufficiently treated in the percolator the valve $a^8$ is raised by means of the chain and the seed or meal discharged into the receptacle B, and thence passes into agitator C, where it is thoroughly turned and stirred by the blades or wings $c^8$, while it is being again subjected to the action of alternate blasts of steam and hot air admitted from pipes $c^3 c^4$ through the chamber $c'$ and perforated false bottom, the gases escaping from the agitator through gas-exit pipe $c^{10}$.

The process is continued in the agitator until the operator, upon examining or testing the meal finds it thoroughly purged, when the gate $c^9$ is opened, and the continued rotation of the shaft $c^6$ causes the blades or wings $c^8$ to discharge the meal through gate $c^9$.

If desired, the whole body of the percolator A may be jacketed and the inner shell perforated, or coils of pipe may be used and air and steam admitted at any desired point in the shell, it being understood that the point of admission of the air and steam does not affect or change the process. Where this is done larger percolators may be used.

The process may be carried out fully in the percolator alone, or equivalent vessel, or in the agitator alone; but for facility and rapidity of operation, especially in treating large masses of seed, it is preferable to treat the meal or seed partly in the percolator, and to complete the process in the agitator.

When the seed has been discharged from the percolator into receptacle B the valve $a^8$ may be lowered and secured on its seat, the percolator recharged, and the percolation of the fresh charge proceeded with, while the previously partially-treated mass may be retained in receptacle B until the charge under treatment in agitator C is finished, thus rendering the operation of the apparatus continuous.

By my method and apparatus the meal may be thoroughly purged from residual hydrocarbon, dried, and rendered marketable in about an hour from the time the percolation is finished, while by the methods commonly practiced ten or twelve hours are necessary to obtain the same result, and the product is inferior.

I am aware that currents of steam alone and currents of air alone have been passed through the meal for the purpose of eliminating the residual hydrocarbon, and do not claim the same, for the reason that if steam at a sufficiently high temperature to be effective is employed the meal is frequently cooked and injured by the heat and the water of condensation; or, if hot air alone is used there is danger of parching the meal and thus injuring the same. I am also aware that the meal has been first heated and agitated in a closed chamber for the purpose of eliminating the residual hydrocarbon; secondly, a jet of steam admitted to the space above the meal for expelling the vapors and to deodorize; thirdly, the meal has then been cooled; and, finally, ventilated and dried by forcing air currents through the mass; and I do not claim such a process, for the reason that while it avoids the cooking or parching of the meal it is a very slow, tedious, and consequently expensive process. But I am not aware that it has ever been proposed to use alternate currents of hot air and steam, so that the air currents should carry off any moisture deposited by the steam, and the moisture deposited by the steam should prevent the parching effect of the hot air, whereby high temperatures could be used and a quick and effective process practiced. Therefore,

Having thus described my invention, what I claim, and desire to secure by Letters Patent, is—

1. The method herein described of purging meal from which oil has been extracted by hydrocarbons, which consists in subjecting the meal to the action of alternate blasts of hot air and of steam which permeate the mass, substantially as and for the purpose specified.

2. The combination, with a percolator having a bracket across its discharge-port, of a conical deflecting-valve arranged to open upward into the percolator, and provided upon its under surface with a pivoted bolt adapted to engage with the bracket on the percolator and lock the valve down on its seat, substantially as specified.

3. In an apparatus for extracting oil and purging meal from residual hydrocarbons, the combination of a perforated jacketed percolator having air and steam induction pipes, an eduction vapor-pipe, and an inwardly-opening discharge-valve, with a closed transfer-receptacle for receiving the meal from the percolator, and an agitator having a perforated false bottom and provided with air and steam induction pipes and a vapor-eduction pipe, the several parts relatively arranged and adapted to operate substantially as and for the purpose specified.

In testimony whereof I affix my signature in presence of two witnesses.

RAYMOND S. PERRIN.

Witnesses:
JOSEPH RUFFUEN,
L. L. BRISTOW.